March 23, 1971 — B. GROLMAN ET AL — 3,572,100
SYNCHRONIZER FOR A TONOMETER
Filed May 28, 1969 — 3 Sheets-Sheet 1

INVENTORS
BERNARD GROLMAN
ROBERT G. LAVALLEE
BY
William C. Nealon
ATTORNEYS

United States Patent Office 3,572,100
Patented Mar. 23, 1971

3,572,100
SYNCHRONIZER FOR A TONOMETER
Bernard Grolman, Worcester, and Robert G. Lavallee, Ashland, Mass., assignors to American Optical Corporation, Southbridge, Mass.
Filed May 28, 1969, Ser. No. 828,506
Int. Cl. A61b *3/16*
U.S. Cl. 73—80                      7 Claims

ABSTRACT OF THE DISCLOSURE

A synchronizer for an air-puff tonometer which through electronic control programs the firing of the air-puff after the trigger mechanism for the tonometer has been actuated. The instrument (combination of air-puff tonometer and synchronizer) is useful as a general diagnostic tool or to more accurately determine intraocular pressure (IOP).

FIELD OF THE INVENTION

The invention relates generally to tonometer devices (useful in measuring intraocular pressure usually to detect glaucoma) and more particularly to an attachment for a tonometer.

PRIOR ART

An air-puff tonometer operates by providing a puff of air directly to the patient's eye without the instrument contacting it and the force of the air puff is increased by use of a predetermined schedule to generate a consistent force versus time envelope or graph for every eye tested. The force is brought up to a point so that applanation of the eye is achieved and the force is then decreased to bring the eye back through applanation. The time from an initial reference to the first applanation is measured and the intra-ocular pressure thereby determined. Another form of air-puff tonometer is operated to generate a fixed force of air and with optical means the reflectance of the eye is determined, which determination is a measure of intra-ocular pressure since the shape of the eye during the test changes to thereby change reflectance. Such air-puff tonometers provide a tremendous advantage to the measurement of intra-ocular pressure in terms of both comfort to the patient because of the lack of contact by the instrument (abates the need for the use of anesthesia) and also in terms of accuracy, in that the measurement is so quick as to eliminate many of the variables present in instruments requiring a longer time for the measurement.

SUMMARY OF THE INVENTION

The device of the invention herein operates in combination with such tonometers by providing the actual puff of air or fluid at precisely the same part of the pulse cycle without regard to the time of the trigger signal for the tonometer.

One important use of the above apparatus is when there is an indication of a vascular irregularity for a patient providing an asymmetry in blood flow to different halves of the body or, more particularly different halves of the head. Such problems may be detected grossly by appearance or other presently used diagnostic tools now available. Confirmation of such a diagnosis may be made by use of apparatus according to the present invention to test whether or not one eye of the patient responds differently in terms of intraocular pressure at a particular part of the patient's pulse cycle or cardiac cycle than the other eye does for the same part of the pulse cycle or cardiac cycle. The combination of the tonometer and the "synchronizer" (as the attachment according to the above description will be referred to during the balance of this application) can be used to indicate the vascular disorder, which may be an occlusion in the blood flow to one eye (ophthalmic artery) or an occlusion in the area of the aorta.

Also, a further and more general use of the tonometer-synchronizer combination is to determine when the highest pressure occurs in terms of part of the pulse cycle and then provide the tonometer measurement at that time. Almost every person has some dependence of his intra-ocular pressure on the part of the pulse cycle when the measurement is taken (even if this dependence is not measureable); therefore, it seems extremely advantageous to eliminate this varaible by taking the tonometer measurement at precisely the same phase of the pulse cycle to insure accuracy. Also, it may be seen that extreme accuracy may be obtained by taking the tonometer measurement at a great number of points representing different phases of the pulse cycle.

The synchronizer-tonometer combination according to the above operation comprises an air-puff tonometer with a control comprising a trigger switch, an air-puff firing mechanism, a pulse cycle phase selector apparatus, a pulse indicating mechanism such as an EKG or pulse plethysmograph (a device for measuring the volume flow of blood) providing an input to said apparatus, and electronics for controlling the timing of said air-puff firing after said trigger switch has been actuated. The electronics includes a plethysmograph or EKG amplifier and pulse shaper, and a ramp generator whose terminal level is determined by coincidence with a selected voltage from said pulse cycle phase selector apparatus.

In order to more fully describe the construction and operation of a synchronizer-tonometer according to the present invention, the following description is provided with reference to the accompanying drawings, wherein:

DETAILED DESCRIPTION

Figure 1:
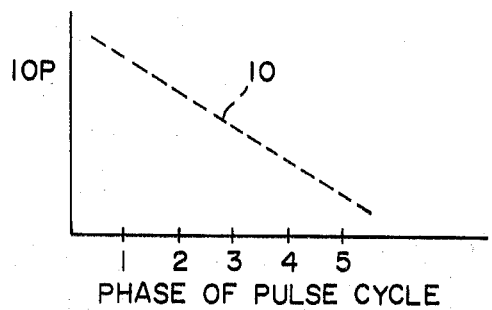
FIG. 1 is an example of the relationship between intraocular pressure and phases of the pulse cycle (hereinafter referred to as the patient pulse profile)
Figure 2:
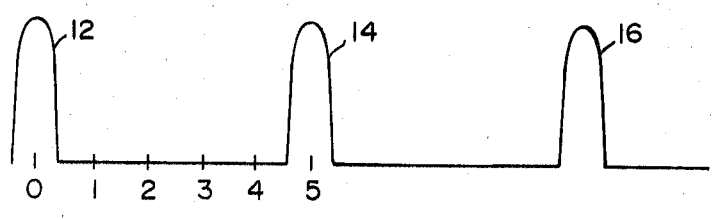
FIG. 2 is a graphical representation of blood flow or pulse versus the phases of the pulse cycle.

It has been determined that every person has a particular pulse cycle profile 10 for intraocular pressure such as that shown in FIG. 1, which represents, by way of example only, a decreasing profile with respect to phases of the pulse cycle. Such a profile may be determined by taking appropriate readings for various parts of the pulse cycle. FIG. 2 represents pulses 12, 14, 16, etc. with each pulse period (such as that between pulses 12, 14) divided into equal parts, for example, five parts as shown in FIG. 2.

Figure 3:
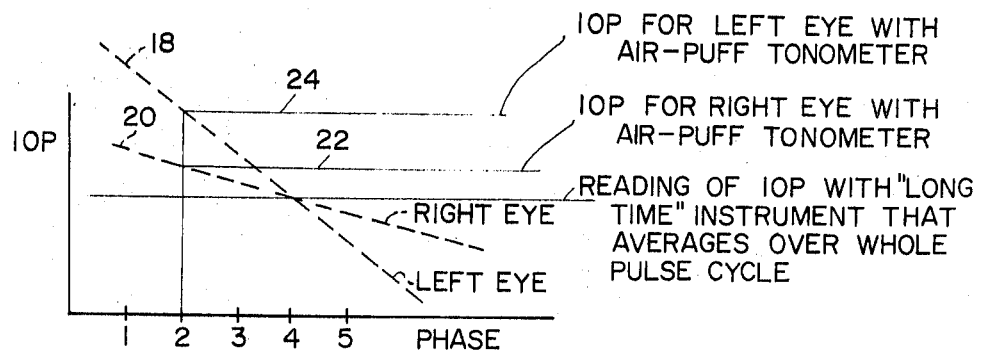
FIG. 3 is a graph of intra-ocular pressure versus phases of the pulse cycle showing sample readings for both the air-puff tonometer and other tonometers taking a much longer time for making the tonometer measurement.

FIG. 3 represents the usefulness of the present invention and its advantages over a tonometer whose reading takes a longer time than the air-puff tonometer. If, for instance, the profiles for a right and left eye of a particular patient are as represented by dotted lines 18 and 20 as shown in FIG. 3, the "long time" instrument would average over a whole pulse cycle for its reading and obtain a particular intraocular pressure showing no difference in reading between the two eyes. On the other hand, the synchronizer-tonometer apparatus according to the present invention by using an air-puff tonometer would obtain a reading 22 for the right eye which is greater than that for the "long time" instrument and a reading 24 for the left eye which is still greater. The difference in intraocular pressure reading between points 22 and 24 may be as much as 20% in particular cases. Further diagnostic procedures would then be instituted to determine whether or not vascular disorders were present either at the aorta or the ophthalmic artery or at another place in the blood flow apparatus of the body.

Figure 4:
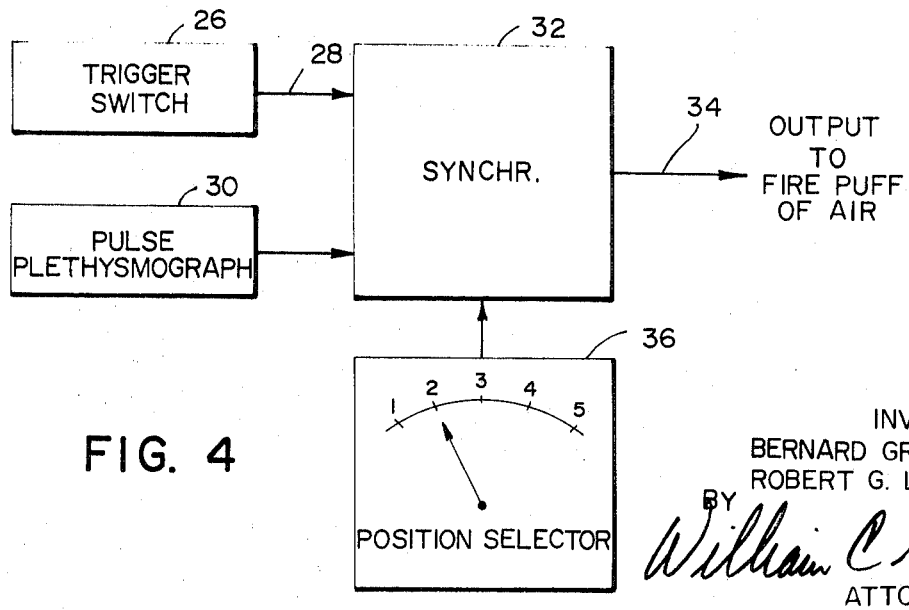
FIG. 4 is a block diagram of a synchronizer-tonometer combination according to the present invention.

Operation of the synchronizer-tonometer combination according to the present invention may be best understood by reference to FIG. 4 which represents a block diagram of the apparatus. The tonometer operator initiates the operation by actuating a trigger switch 26 which provides an input 28 to the synchronizer circuit. Another input to the synchronizer 32 is provided by the pulse plethysmograph 30. The output 34 from the synchronizer, however, is enabled only by control from the position selector 36 which programs the synchronizer to fire the air puff at the eye of the patient at a selected time after the pulse of the patient (for instance, during one of the five phases into which the pulse cycle is divided).

Figure 5:
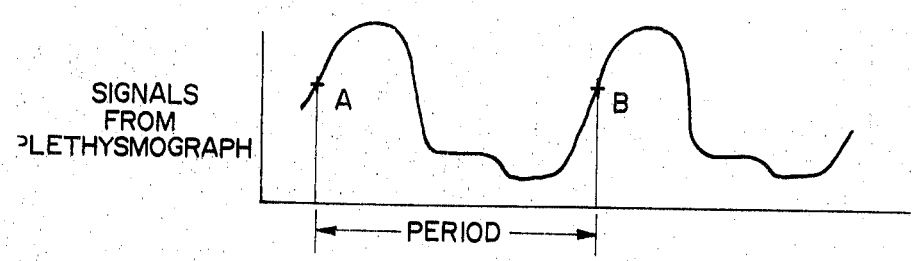
FIG. 5 is a graph of a representation of signals from a plethysmograph versus pulse period.
Figure 6:
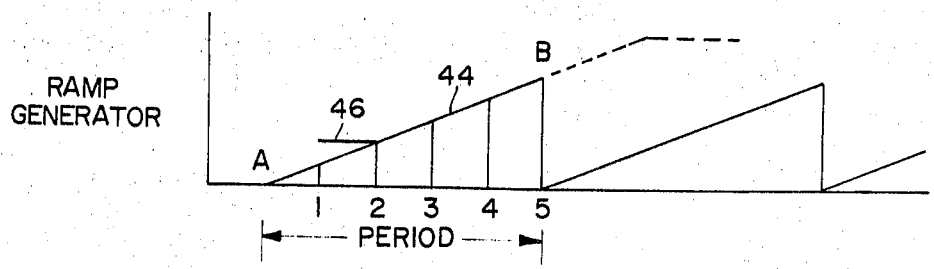
FIG. 6 is a representation of the signal produced by a ramp generator for the pulse cycle.
Figure 7:
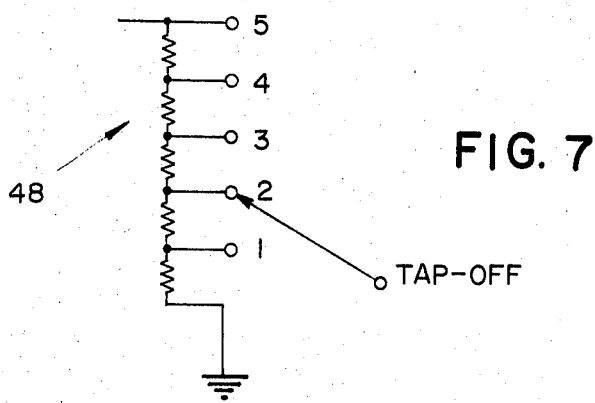
FIG. 7 is a schematic of a time divider circuit useful in the present invention.

Operation according to FIGS. 5, 6 and 7 is initiated by selection of a particular pulse phase such as 2 in the time divider 49 of FIG. 7 wherein the total voltage is equal to the peak voltage of the ramp, determined by the period A–B of the plethysmograph signal of FIG. 5. If 2 is selected by tap-off of voltage from the peak reader, the potential is thereby determined at two-fifths of the plethysmograph signal period. A pulse shaper differentiates the signal of FIG. 5 to provide a plot similar to that of FIG. 2 and a larger difference in voltage per unit time to allow a threshold detector to more accurately determine the period of the plethysmograph signal at the same point in each pulse. Since the same period A–B is used for the ramp signal 44 of FIG. 6, the ramp signal period will be terminated at a voltage level equal to two-fifths of the total voltage from the time divider 48 of FIG. 7. The operation according to FIGS. 5 through 7 thereby produces a direct current level 46 inversely proportional to the pulse rate and the control represented by the five position selector of FIG. 4 determines that direct current level. When the pulse plethysmograph reaches that point in its period, the production of an output to fire the air puff will be enabled.

It should be understood that the electrical signal from the plythysmograph may be taken from the finger, the gums, the temple, the carotid artery, the earlobe, or other places with which a plethysmograph reading is commonly taken. Also, it might be particularly useful to provide an EKG (electrical signal from the heart) instead of a plethysmograph in order to cut down the time delay in blood flow to a part of the body such as the finger, thereby taking the measurement right at the source of the pulse, the heart.

Figure 8:
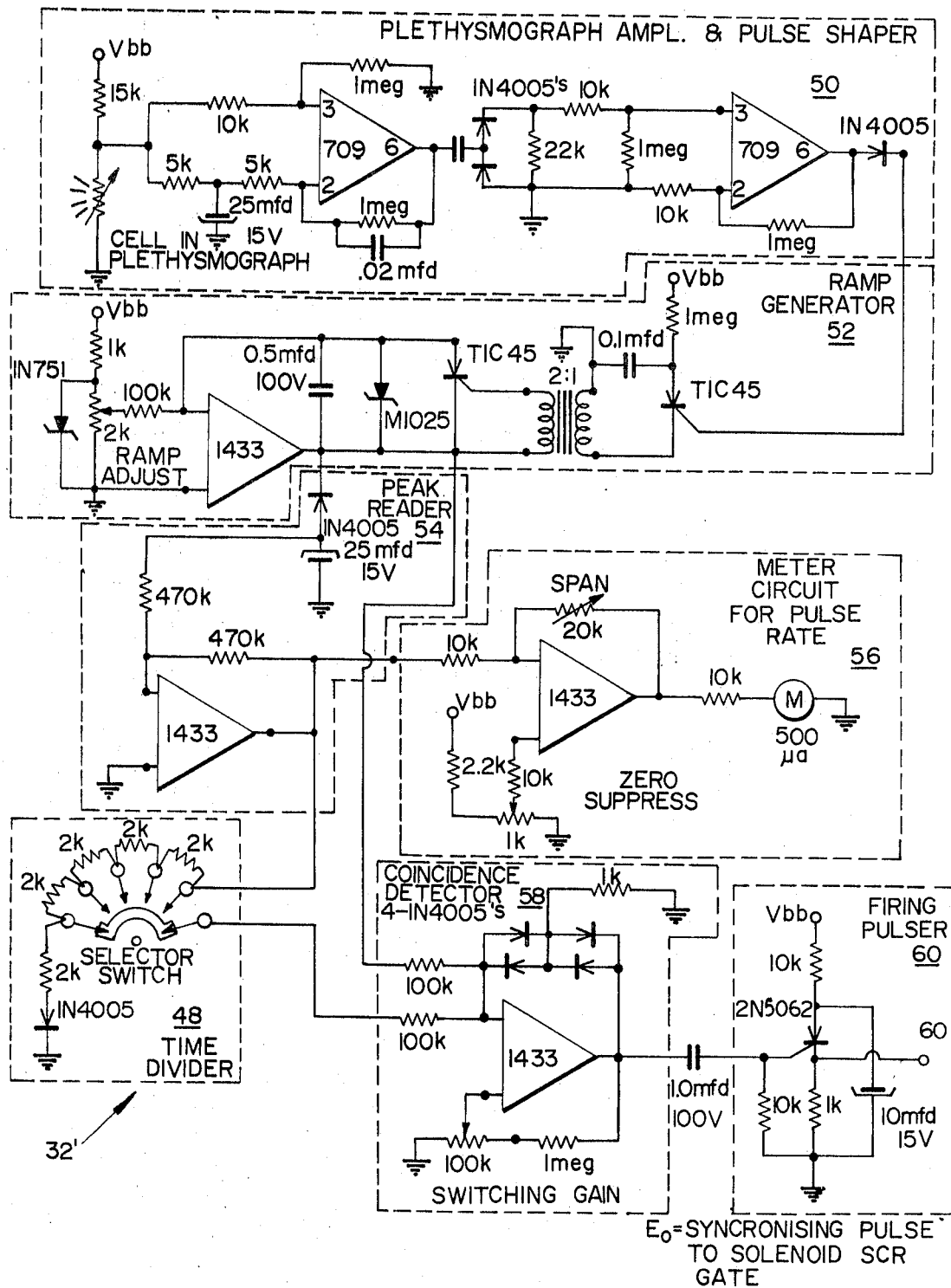
FIG. 8 is an overall circuit diagram of the synchronizer useful in the present invention.

FIG. 8 shows the entire control circuit 32' of the synchronizer including a plethysmograph amplifier and pulse shaper 50, a ramp generator 52, a peak reader 54, a meter circuit for the pulse rate 56, a time divider 48, a coincidence detector 58 and a firing pulse generator 60.

The input to the circuit of FIG. 8 comes from a finger plethysmograph whose output is the result of blood flow near the skin of the finger (also it is contemplated that such an input could come from an electrocardiogram). The signal then varies with pulse (cardiac cycle) and by amplifying and shaping, a pulse is developed whose period is equal to the interval between heartbeats. The ramp generator 52 is an integrator circuit whose output is the linear ramp voltage resulting from a constant current input. The termination and re-cycling of the ramp is controlled by the output of amplifier and pulse shaper 50. The output of the ramp generator 52 is a saw-toothed wave whose period is controlled by the cardiac cycle. The ramp being linear with time reaches a maximum proportional to the cardiac cycle. The peak reading circuit 54 has an output of direct current voltage which is equal to the maximum for the ramp 52, so that direct current voltage is then proportional to the cardiac cycle. The meter 56 is a direct current amplifier with gain and offset controls to match the output of the peak reader 54 to the meter, so that the meter can be calibrated to read directly in pulse rate. The meter is used by a tonometer operator as a check to insure proper placement and function of the plethysmograph. The time divider 48 is a five-position switch which allows the operator to select a voltage which is proportional to a known segment of the total voltage from the peak reader 54. The voltage from the peak reader is proportional to the cardiac cycle and if position 2 of the switch is selected, it is equal to ⅖ of the total, since the output voltage is proportional to ⅖ of the period of the total pulse rate. The output of the coincidence detector 58 changes state instantaneously when its two input voltages become equal. One input is the voltage selected by use of the time divider 48 and the other is the ramp voltage developed by the ramp generator 52. The selected voltage from the time divider 48 is a direct current positive voltage with the ramp voltage starting at zero and increasing at a constant rate. When coincidence occurs, i.e., the ramp reaches the time divider voltage, the output of coincidence detector 58 changes state and a sharp pulse is available which is related to the fraction of the total period of the cardiac cycle. Firing pulser 60 is for interfacing to supply the tonometer circuitry with a low impedance pulse of the proper polarity to fire an air-puff solenoid.

In FIG. 6, ramp generator signal 44 increases linearly with time. The peak value of ramp signal 44 occurs at the end of a period. Therefore, any particular value of ramp signal 44 during the period is directly proportional to the time from the beginning of the period to the occurrence of that particular value.

For example, if the period were longer than that illustrated in FIG. 6, ramp signal 44 would linearly extend beyond illustrated point B along the dashed line segment, to a new terminal level occurring in time later than point B. The new terminal level would be a voltage higher than the voltage of point B and values of ramp voltage corresponding to each of the five phases would be similarly proportionately higher.

Referring to FIG. 8, the two input signals applied to coincidence detector 58 are a ramp signal and a DC signal. The DC signal from time divider 48 is a percentage of peak voltage of ramp signal 44. Both signals are derived from the same voltage source; namely, ramp generator 52.

The DC signal in time divider 48 is derived from peak reader 54 whose input, in turn, is derived from the output of ramp generator 52. The ramp signal is derived directly from the output of ramp generator 52. Ramp generator 52 is therefore a common source of voltage for these two input signals. Thus, if the period increases as previously described, for example, peak ramp voltage linearly increases and DC voltage from the peak reader increases in direct proportion thereto.

A significant net effect of simultaneous proportional increases (or decreases) in both signals is to provide an output from coincidence detector 58 at various times corresponding to a fixed percentage of period (or phase), independent of period variation. For example, if position selector 36 in FIG. 4 is set to number 2 as shown, firing pulser 60 in FIG. 8 will provide a pulse to trigger an air-puff firing mechanism always at 40% of the period for each successive period regardless of any increase or decrease in the periods or heartbeat rates.

A typical sequence of operations for the preferred embodiment includes the ophthamologist operatively attaching finger plethysmograph apparatus to the patient, aligning the patient's head in a chin rest and forehead brace to set the patient's eye with the tonemeter output port, setting the position selector to the desired phase of the patient's pulse cycle, actuating the tonometer trigger, and reading the tonometer output from its electronic or other display means. The above sequence is repeated for the other eye of the patient and the variation in IOP with phase of pulse cycle thereby rendered inconsequential to the accuracy of the tonometer reading.

What is claimed is:

1. The combination of a synchronizer which receives an input from a pulse indicating mechanism for indicating pulses, and a tonometer, said combination comprising:
   an air puff tonometer;
   means for producing first signals proportional to the pulse frequency;
   means for continuously generating a second signal with a period coincidental with and equal to the interval between successive said pulses;
   means for variably selecting an intermediate value of said second signal;
   means for generating a third signal each time said second signal attains said intermediate value; and
   means for actuating said tonometer in response to said third signal.

2. The invention according to claim 1 wherein said means for producing first signals comprises an amplifier and a pulse shaper; said means for generating a second signal comprises a ramp generator; said means for selecting an intermediate value of said second signal comprises a pulse cycle time divider; and said means for providing a third signal comprises a coincidence detector.

3. The invention according to claim 1 wherein said means for producing first signals comprises a pulse plethysmograph.

4. The invention according to claim 1 wherein means for producing first signals comprises an electrocardiogram mechanism.

5. The invention according to claim 2 wherein said means for selecting an intermediate value further comprises means for determining the percentage of the pulse period at which said intermediate value is to be selected.

6. The invention according to claim 3 further comprising a peak reader for providing a direct current voltage output equal to the terminal level of said ramp generator; a meter; and a meter circuit having gain and offset controls for matching the output of the peak reader to said meter so that said meter is usable as a check to insure proper functioning of said plethysmograph.

7. A tonometer synchronizer for synchronizing a fluid-pulse discharging mechanism with cardiac signals from a patient, said synchronizer comprising:
   sensing means for sensing said cardiac signals;
   a ramp voltage generator responsive to operation of said sensing means for generating successive ramp voltages, the generation of each of said voltages being initiated upon occurrence of a first cardiac signal and being terminated upon occurrence of the next successive cardiac signal;
   a peak detector responsive to the operation of said generating means for determining peak voltage of each of said ramp voltages;
   means for deriving D.C. voltage corresponding to said peak voltage from said peak detector;
   selector means for selecting a fraction of said D.C. voltage;
   a coincidence detector for comparing said fraction of said D.C. voltage with each of said ramp voltages and for detecting each occurrence of amplitude-coincidence therebetween; and,
   actuator means responsive to each said occurrence of amplitude-coincidence for actuating said mechanism.

References Cited

UNITED STATES PATENTS

| | | | |
|---|---|---|---|
| 3,101,082 | 8/1963 | Steen | 128—2.05 |
| 3,232,099 | 2/1966 | Motchenbacher | 73—80 |
| 3,280,817 | 10/1966 | Jorgensen | 128—2.05 |
| 3,352,300 | 11/1967 | Rose | 128—2.06 |

OTHER REFERENCES

E. G. A. van Beuningen: German application 1,078,735 of Mar. 31, 1960.

JAMES J. GILL, Primary Examiner

C. E. SNEE III, Assistant Examiner

U.S. Cl. X.R.

128—2